(12) United States Patent
Matsuno

(10) Patent No.: US 8,477,194 B2
(45) Date of Patent: Jul. 2, 2013

(54) IMAGE CAPTURING APPARATUS, CONTROL METHOD THEREOF, AND PROGRAM

(75) Inventor: Keisuke Matsuno, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 572 days.

(21) Appl. No.: 12/645,087

(22) Filed: Dec. 22, 2009

(65) Prior Publication Data

US 2010/0171836 A1 Jul. 8, 2010

(30) Foreign Application Priority Data

Jan. 7, 2009 (JP) ................................ 2009-001830
Nov. 25, 2009 (JP) ................................ 2009-267830

(51) Int. Cl.
H04N 5/225 (2006.01)

(52) U.S. Cl.
USPC .......................................... 348/169; 396/147

(58) Field of Classification Search
USPC .......................................... 396/147; 348/169
See application file for complete search history.

(56) References Cited

U.S. PATENT DOCUMENTS

| 7,590,343 B2 * | 9/2009 | Yata ............................... 396/147 |
| 7,602,417 B2 | 10/2009 | Ogasawara et al. |
| 7,916,895 B2 * | 3/2011 | Johnson ......................... 382/103 |
| 2004/0095467 A1 * | 5/2004 | Koizumi ......................... 348/169 |
| 2006/0182433 A1 | 8/2006 | Kawahara et al. |
| 2006/0210260 A1 * | 9/2006 | Yata ............................... 396/147 |
| 2008/0080739 A1 * | 4/2008 | Muramatsu ................... 382/103 |
| 2009/0295926 A1 * | 12/2009 | Miyazaki ...................... 348/169 |

FOREIGN PATENT DOCUMENTS

| JP | 2006-227080 | 8/2006 |
| JP | 2007-068147 | 3/2007 |

* cited by examiner

*Primary Examiner* — David Lazaro
(74) *Attorney, Agent, or Firm* — Cowan, Liebowitz & Latman, P.C.

(57) ABSTRACT

An image capturing apparatus comprising an object detection unit which detects a specific object from an image signal, and a control unit which performs first control corresponding to the specific object when the object detection unit detects the specific object, and performs second control different from the first control when the object detection unit does not detect the specific object, wherein when a state in which the specific object is detected by the object detection unit transits to a state in which the specific object becomes undetectable, the control unit changes, based on information before the specific object becomes undetectable, at least either of a time for which the first control is held and a transition speed when transiting from the first control to the second control.

19 Claims, 6 Drawing Sheets

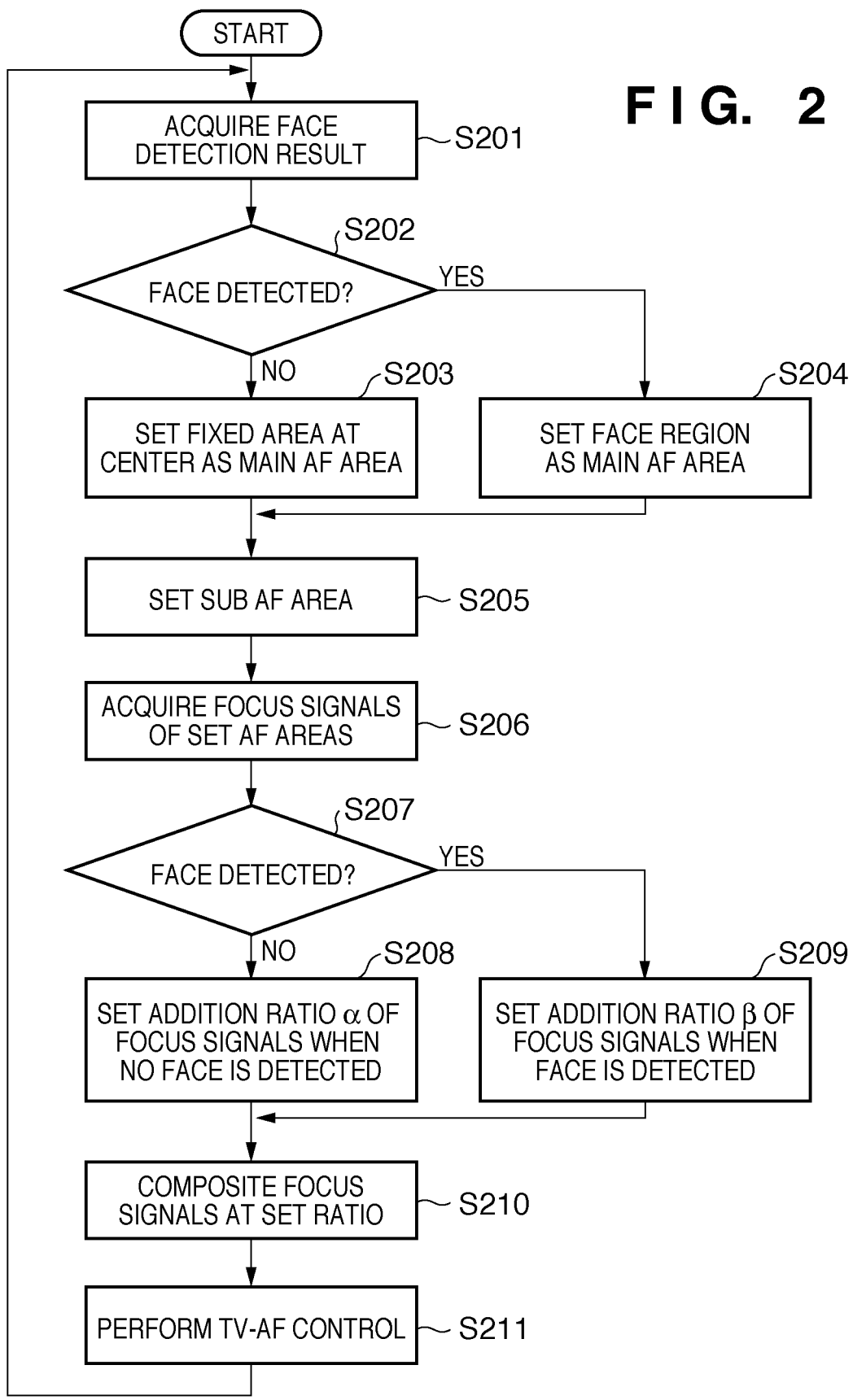

IMAGE CAPTURING APPARATUS, CONTROL METHOD THEREOF, AND PROGRAM

BACKGROUND OF THE INVENTION

1. Field of the Invention

The present invention relates to an image capturing apparatus having an object detection function.

2. Description of the Related Art

In conventional focus adjustment control of image capturing apparatuses such as a video camera, the TV-AF method is the mainstream. According to this method, a focus signal representing sharpness (contrast) is detected from image signals obtained by an image sensor, and the focus lens position is controlled to maximize the focus signal.

For example, Japanese Patent Laid-Open No. 2006-227080 proposes an arrangement in which a face region is detected as a predetermined target object from an image, an AF (Auto Focus) area is set to contain the detected face region, and focus detection is done. When a face region is detected, an image capturing apparatus having this arrangement performs AF control using a focus signal obtained from the face region, and when no face region is detected, executes it using a focus signal obtained from the entire frame.

When a predetermined target object is detected from a moving image, like a video camera, it is difficult to keep stably detecting the target object because the target object moves or changes the direction. The image capturing apparatus having the arrangement disclosed in Japanese Patent Laid-Open No. 2006-227080 often switches between a state in which AF is done using a focus signal obtained from the face region and a state in which AF is done using a focus signal obtained from the entire frame. The image changes frequently, bothering the user.

As a measure to solve a similar problem, Japanese Patent Laid-Open No. 2007-68147 proposes an image capturing apparatus which, even if a target object which has been detected is lost, keeps displaying an object frame displayed over the target object for a predetermined holding time. When a target object is lost for only a short time, the image capturing apparatus keeps displaying the object frame representing that the target object is displayed. This can prevent the object frame from frequently appearing and vanishing, and thus can reduce an annoying display on the frame. This arrangement can be applied to the TV-AF method to suppress frequent switching of the target position of the focus lens. That is, even if a face region which has been detected is lost, AF control is executed for a predetermined holding time using a focus signal obtained from the region where the face region has been detected.

However, there is a challenge in how to set a predetermined holding time for holding a control state before losing a target object when the target object is lost. More specifically, when the holding time is set long, it can be suppressed to frequently switch the target position of the focus lens. However, even if the target object moves out of the frame, the control does not switch quickly, failing in appropriate AF control for a new object. In contrast, when the holding time is set short, AF control can quickly track a new object upon a change of the object. However, even when the target object vanishes only temporarily, the target position of the focus lens is switched, as described above, and the image changes annoyingly.

This is not limited to AF control. The same problem arises when a predetermined target object is detected from an image to perform image correction processes such as AE (Auto Exposure) control, WB (White Balance) control, luminance signal correction, and noise reduction.

SUMMARY OF THE INVENTION

The present invention has been made to overcome the conventional drawbacks, and appropriately switches control when a target object vanishes from the frame.

According to the first aspect of the present invention, there is provided an image capturing apparatus comprising an object detection unit which detects a specific object from an image signal, and a control unit which performs first control corresponding to the specific object when the object detection unit detects the specific object, and performs second control different from the first control when the object detection unit does not detect the specific object, wherein when a state in which the specific object is detected by the object detection unit transits to a state in which the specific object becomes undetectable, the control unit changes, based on information before the specific object becomes undetectable, at least either of a time for which the first control is held and a transition speed when transiting from the first control to the second control.

According to the second aspect of the present invention, there is provided a method of controlling an image capturing apparatus, comprising the steps of detecting a specific object from an image signal captured by the image capturing apparatus, and performing first control corresponding to the specific object when the specific object is detected in the step of detecting a specific object, and performing second control different from the first control when the specific object is not detected in the step of detecting a specific object, wherein in the step of performing first control, when a state in which the specific object is detected in the step of detecting a specific object transits to a state in which the specific object becomes undetectable, at least either of a time for which the first control is held and a transition speed when transiting from the first control to the second control is changed based on information before the specific object becomes undetectable.

Further features of the present invention will become apparent from the following description of exemplary embodiments with reference to the attached drawings.

BRIEF DESCRIPTION OF THE DRAWINGS

FIG. 2 is a flowchart showing the overall sequence of AF control in the first embodiment;

DESCRIPTION OF THE EMBODIMENTS

Embodiments of the present invention will be described in detail below with reference to the accompanying drawings.

First Embodiment

A first embodiment for practicing the present invention will now be explained in detail with reference to the accompanying drawings.

Figure 1:
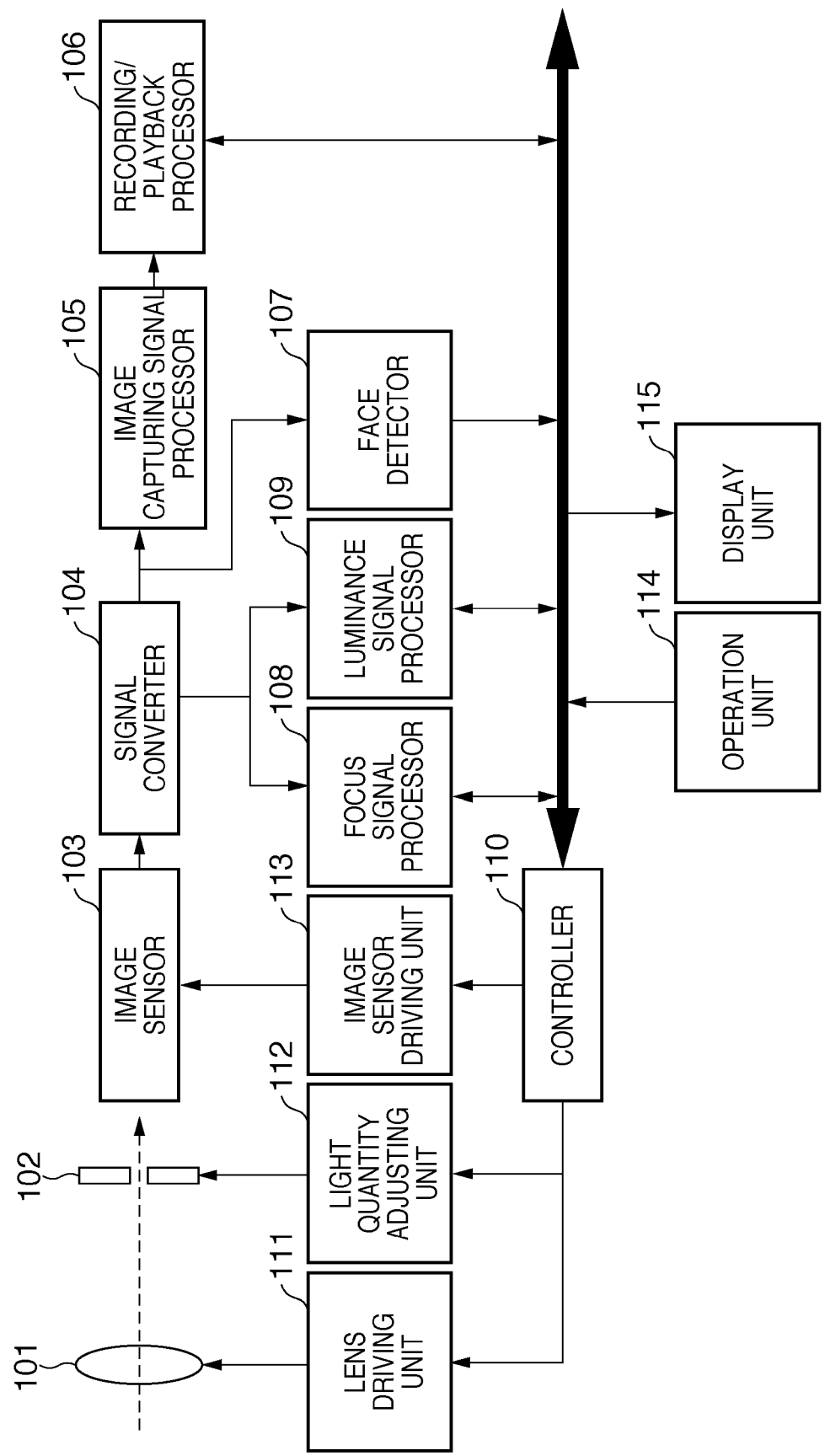
FIG. 1 is a block diagram showing the arrangement of an image capturing apparatus according to the first embodiment of the present invention.

FIG. 1 is a block diagram showing the arrangement of a video camera as an example of an image capturing apparatus in the first embodiment of the present invention. The first embodiment will explain a video camera, but the present invention is also applicable to another image capturing apparatus capable of acquiring a moving image, such as a digital still camera.

Referring to FIG. 1, an optical lens unit 101 is made up of a plurality of lenses including a focus compensator lens (to be referred to as a "focus lens") having both a function of correcting the movement of the focal plane upon zooming and a focusing function. A light quantity adjusting device 102 is a stop and adjusts the quantity of light incident on an image sensor 103 by controlling the aperture diameter. The image sensor 103 is formed from a CCD sensor or CMOS sensor, and includes a photoelectric converter capable of photoelectrically converting an object image to obtain a captured image. A signal converter 104 samples an output from the image sensor 103, adjusts the gain, and digitizes the output. An image capturing signal processor 105 performs various image processes for an output signal from the signal converter 104, generating an image signal. A recording/playback processor 106 records an image signal from the image capturing signal processor 105 on a recording medium such as a magnetic tape, optical disk, or semiconductor memory, and plays back a recorded image signal.

A face detector 107 executes face detection processing for an image signal output from the signal converter 104, and detects object information (the size and position of a human face within the shooting frame and the reliability of the face). The face detector 107 outputs the detection result to a controller 110 (to be described later). As the face detection processing, for example, there is known a method of extracting a skin color region from the halftone color of each pixel represented by image data, and detecting a face based on the level of matching with a face contour plate prepared in advance. There is also proposed a method of detecting a face by detecting the feature points of a face such as the eye, nose, and mouth using a known pattern recognition technique. The present invention is not limited by face detection processing and can adopt any kind of method.

A focus signal processor 108 generates a focus signal by extracting a high-frequency component from an image signal output from the signal converter 104, a luminance difference component generated from the high-frequency component, and the like. The focus signal processor 108 outputs the focus signal to the controller 110. The focus signal represents the sharpness (contrast) of an image generated based on an output signal from the image sensor 103. The sharpness changes depending on the focus state of the imaging optical system, and thus the focus signal resultantly represents the focus state of the imaging optical system. The focus signal processor 108 can extract a focus signal for each AF area set by the controller 110. When the controller 110 sets a face region detected by the face detector 107 as an AF area, the focus signal processor 108 can extract a focus signal in this face region. A luminance signal processor 109 extracts a luminance component from an image signal output from the signal converter 104, generates a luminance signal, and outputs it to the controller 110. The luminance signal processor 109 can extract a luminance signal for each AE area set by the controller 110.

The controller 110 controls the overall image capturing apparatus including a lens driving unit 111, light quantity adjusting unit 112, and image sensor driving unit 113. By using a face region detected by the face detector 107, the controller 110 sets a main AF area and main AE area for the focus signal processor 108 and luminance signal processor 109. The lens driving unit 111 drives the focus lens of the optical lens unit 101 in accordance with an instruction from the controller 110 which has received a focus signal output from the focus signal processor 108. The light quantity adjusting unit 112 drives the light quantity adjusting device 102 in accordance with an instruction from the controller 110 which has received a luminance signal output from the luminance signal processor 109. The image sensor driving unit 113 drives the image sensor 103 in accordance with an instruction from the controller 110 which has received a luminance signal output from the luminance signal processor 109. An operation unit 114 accepts an instruction from the user and transmits it to the controller 110. A display unit 115 is formed from, for example, an LCD or organic EL. The display unit 115 displays a menu window, and displays an image using an image signal obtained by shooting or an image signal played back by the recording/playback processor 106.

The outline of AF (Auto Focus) control performed by the controller 110 in the first embodiment of the present invention will be explained with reference to FIG. 2. The AF control is executed according to a computer program stored in a ROM in the controller 110.

FIG. 2 is a flowchart showing the overall sequence of AF control in the first embodiment. The control shown in FIG. 2 is repetitively executed, for example, every time an image signal of one frame (or field) is read out from the image sensor 103, or every plurality of frames (or fields).

In step S201 of FIG. 2, the controller 110 acquires, from the face detector 107, information (face detection result) on the result of face detection processing for an image signal output from the signal converter 104. In step S202, the controller 110 determines, from the face detection result acquired in step S201, whether a face has been detected. If no face has been detected, the process advances to step S203; if a face has been detected, to step S204. In step S203, the controller 110 sets, as a main AF area, a fixed area which is set in advance at the center of the shooting frame and is not based on the face detection result (unrelated to a specific object). In step S204, the controller 110 sets, as a main AF area, a face region based on the face detection result acquired in step S201.

In step S205, the controller 110 sets, as a sub AF area, a fixed area which is a wide region containing the main AF area set in step S203 or S204 and is not based on the face detection result. By setting the AF areas in step S203 or S204 and step S205, the focus signal processor 108 can acquire a focus signal serving as the base of TV-AF control. At this time, a filter coefficient in the focus signal processor 108 is set to build a plurality of bandpass filters having different extraction characteristics. The extraction characteristic is the frequency characteristic of a bandpass filter. Setting a filter coefficient means changing the set value of the bandpass filter in the focus signal processor 108.

In step S206, the controller 110 acquires the focus signals of the AF areas set in step S203 or S204 and step S205. In the first embodiment, a focus signal in each face region is stored as a history in a memory or the like in order to track the history and reuse a focus signal when compositing focus signals in step S210 (to be described later) upon a change of the face region to be controlled.

In step S207, the controller 110 determines again, from the face detection result acquired in step S201, whether a face has been detected. If no face has been detected, the process advances to step S208; if a face has been detected, to step S209.

In step S208, the controller 110 sets an addition ratio α used to composite, in step S210 (to be described later), the focus signals acquired in step S206 when no face is detected.

The addition ratio α is the addition ratio of a focus signal obtained from the sub AF area set in step S205 to a focus signal obtained from the main AF area set in step S203.

In step S209, the controller 110 sets an addition ratio β used to composite, in step S210 (to be described later), the focus signals acquired in step S206 when a face is detected. The addition ratio β is the addition ratio of a focus signal obtained from the sub AF area set in step S205 to a focus signal obtained from the main AF area set in step S204. At this time, the addition ratio β is smaller than the addition ratio α set in step S208 when no face is detected. In other words, the ratio of a focus signal obtained from the main AF area is set high. This can relatively increase the weight of a focus signal corresponding to a low-contrast human face, more easily focusing on a main object as compared with a conventional method.

In step S210, the controller 110 composites the focus signals acquired in step S206 based on the addition ratio set in step S208 or S209. In step S211, the controller 110 performs focus adjustment by TV-AV control based on the focus signal composited in step S210, and then returns to step S201.

In this way, the AF control shown in FIG. 2 is done by increasing the weight on the focus signal of the main AF area with respect to that on the focus signal of the sub AF area in a case in which a face is detected from an image signal, compared to a case in which no face is detected. Hence, when a state in which detection of a face region is successful changes to one in which the detection fails, the focus signal composition method in step S209 changes, too.

If a face region which has been detected moves outside the frame, it is desirable to quickly switch the focus signal composition method and use a focus signal obtained by composition at the addition ratio α in step S209, in terms of performing AF control corresponding to a change of the object. To the contrary, if a face region which has been detected becomes undetectable only temporarily, it is desirable to regard the current state as one in which the face region is kept detected, and perform AF control without switching the focus signal composition method, because a temporal change of the image can be suppressed.

From this, according to the first embodiment, when a face is lost, the controller 110 changes the duration of the holding time in accordance with the state of a finally detected face. Until the holding time elapses, the controller 110 regards, as a main AF area, a region where the face region was detected finally, and obtains a focus signal using the addition ratio β.

After the lapse of the holding time, the controller 110 sets, as a main AF area, a fixed region which is set in advance and is not based on the face detection result, and obtains a focus signal using the addition ratio α. Also at this time, the controller 110 adopts a contrivance. More specifically, the controller 110 gradually changes the main AF area from a region where the face was detected to the fixed region, instead of obtaining a focus signal using the fixed region as the main AF area immediately after the lapse of the holding time. The controller 110 changes the transition speed in accordance with the state of a finally detected face.

This is because the face region may be detected again even after the lapse of the holding time. When the holding time has elapsed and the face is detected during the transition of the main AF area to the fixed region, the face region needs to be set as the main AF area again. In a situation in which the face region is highly likely to be detected, the transition speed is set low to minimize the change width of the focus signal even upon transition to a state in which the face region is set as the main AF area again. In contrast, in a situation in which the face region is less likely to be detected, the transition speed is set high because the possibility that the face region is set as the main AF area again is low.

Figure 3A:
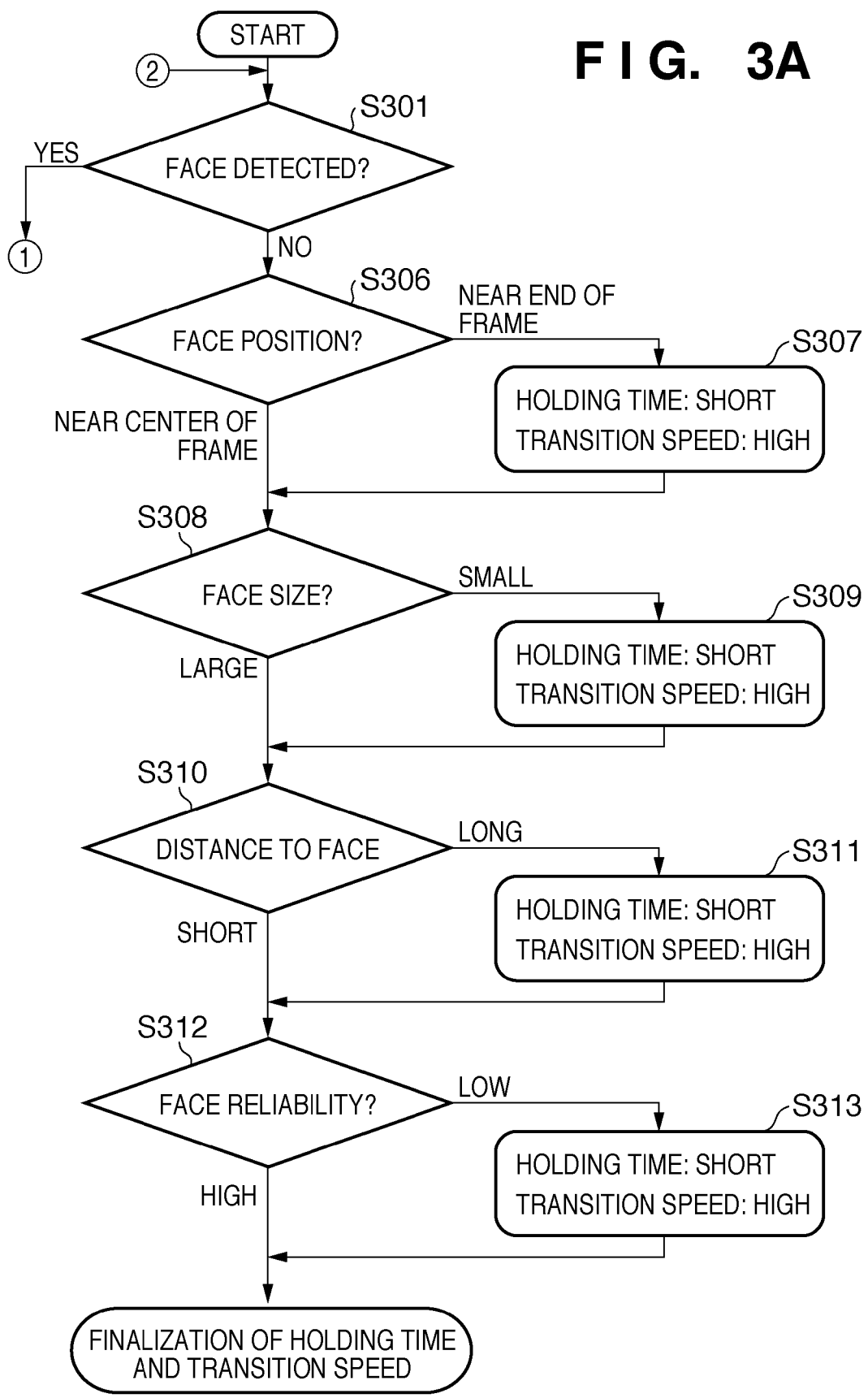
FIGS. 3A and 3B are flowcharts for explaining the setting operation of the holding time and transition speed when a face becomes undetectable in the first embodiment.
Figure 3B:
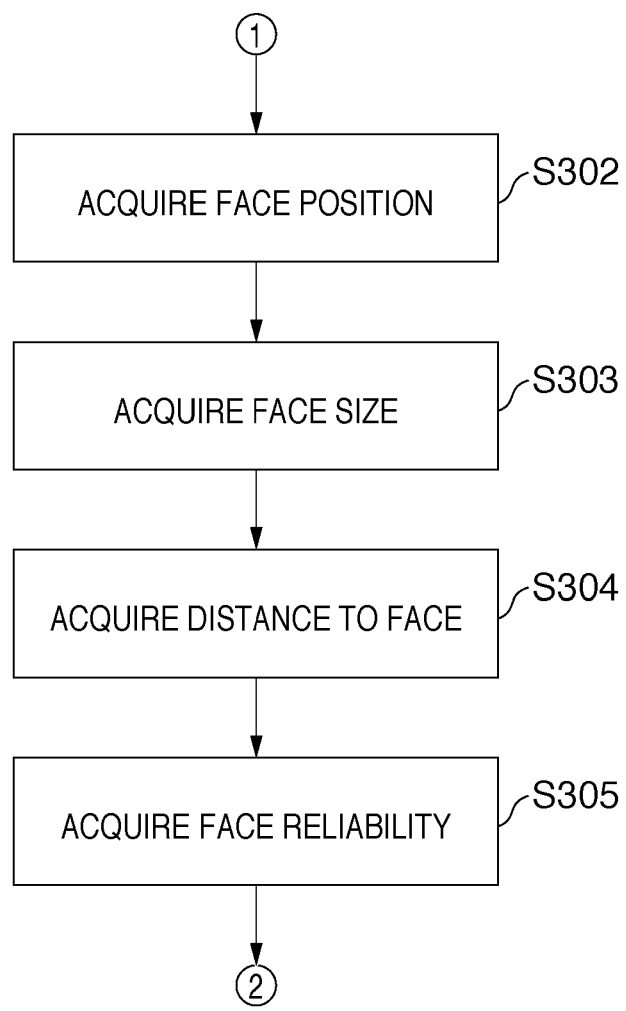

FIGS. 3A and 3B are flowcharts for explaining the setting operation of the holding time and transition speed when a face which has been detected by the face detector 107 becomes undetectable in the image capturing apparatus according to the first embodiment. This sequence starts when the face detector 107 detects a face region from an image signal, and ends upon the lapse of the holding time after the face is lost.

In step S301 of FIG. 3A, the controller 110 acquires the latest face detection result from the face detector 107, and if the face detection is successful, advances to step S302. While the face region is detected, the controller 110 acquires, in steps S302 to S305, position information of the face region detected by the face detector 107, size information, distance information to the face, and reliability information representing the reliability of the face. As examples of face information, the position, size, distance, and reliability are acquired, but some of them or other kinds of information may be acquired. The reliability is a parameter indicating the level of matching between an object and a condition used by the face detection function when determining that the object is a face.

In this case, it is assumed that high reliability means that the possibility that the object is a face is high, and low reliability means that it is low. The distance information to the face can be attained from the position of the focus lens when the face was detected.

If the face region becomes undetectable, the controller 110 advances from step S301 to step S306 to determine whether position information of a finally acquired face (position information of a face immediately before the face becomes undetectable) represents the vicinity of the center of the frame or the end of the frame. If the face position is close to the end of the angle of view (is the vicinity of the end), the controller 110 advances to step S307 to set a short holding time (shorten the holding time) and a high transition speed (shorten the transition time). This is because it is considered that when the face position immediately before the face becomes undetectable is close to the end of the angle of view, the person is highly likely to have moved outside the frame and thus the face cannot be detected and is less likely to reappear. In this situation, the controller 110 quickly transits from AF control using the face region as a main AF area to one using the fixed region as a main AF area. Although the controller 110 does not particularly perform processing when the face position is close to the center of the angle of view, it may execute processing of prolonging the holding time and decreasing the transition speed (prolonging the transition time).

In step S308, the controller 110 determines whether size information of the finally acquired face is larger than a threshold or is equal to or smaller than it. If the face size is smaller than a given ratio with respect to the angle of view (is equal to or smaller than the threshold), the controller 110 advances to step S309 to set a short holding time and high transition speed. This is because a small face size with respect to the angle of view means that the person is highly likely not to be a main object. Hence, the controller 110 quickly transits from AF control using the face region as a main AF area to one using the fixed region as a main AF area.

In step S310, the controller 110 determines, based on distance information to the finally acquired face, whether the distance to the face is larger than a threshold or is equal to or smaller than it. If the distance to the face is long (is larger than the threshold), the controller 110 advances to step S311 to set a short holding time and high transition speed. This is because a long distance to the face means that the person is highly likely not to be a main object. The controller 110 therefore quickly transits from AF control using the face region as a main AF area to one using the fixed region as a main AF area.

In step S312, the controller 110 determines, based on reliability information of the finally acquired face, whether the reliability is higher than a threshold or is equal to or smaller than it. If the face reliability is low (is lower than the threshold), the controller 110 advances to step S313 to set a short holding time and high transition speed. This is because when the face reliability is low, an object which is not a face may be erroneously detected as a face. Thus, the controller 110 quickly transits from AF control using the face region as a main AF area to one using the fixed region as a main AF area.

As described above, based on the state of the finally detected face region, the image capturing apparatus in the first embodiment changes the holding time and transition speed when transiting from AF control using the face region as a main AF area to one using the fixed region as a main AF area. Depending on the situation, it is determined which of a problem that it is difficult to execute appropriate AF control for a new object and a problem that the image changes annoyingly is to be solved preferentially. With this arrangement, a user-friendly image capturing apparatus can be provided.

In the first embodiment, the holding time and transition speed are changed in accordance with the face position, the face size, the distance to the face, and the face reliability. However, only some of these parameters may be employed as criteria for changing the holding time and transition speed. Alternatively, only either the holding time or transition speed may be changed.

When it is determined in step S308 that the face size is large, processing of prolonging the holding time and decreasing the transition speed may be done as well as in step S306. This also applies to a case in which it is determined in step S310 that the distance to the face is short or a case in which it is determined in step S312 that the face reliability is high.

As criteria for changing the control when the face becomes undetectable, the first embodiment adopts position information, size information, distance information, and reliability information of a face immediately before the face becomes undetectable. However, other kinds of information are also available. Examples are information on the direction in which the face position has moved within the angle of view, information on how the face size has changed within the angle of view, information on how the distance to the face has changed, and information on how the reliability value of the face has changed. In this case, all or some pieces of information in the period during which the face has been detected are accumulated, and a change of each information is read. Depending on the change, the holding time in face detection control can be changed or the speed of transition from face detection control to normal control can be changed.

As other kinds of information, for example, information on the focus state of a face and the information on the movement (e.g., panning and tilting) of the image capturing apparatus itself may be acquired. Based on a change of the information, the holding time and transition speed are changed.

The first embodiment has exemplified switching between AF control using the face region as a main AF area and one using the fixed region as a main AF area on the premise that the focus signals of the main AF area and sub AF area are composited. However, the present invention is not limited to this. For example, when a face is detected, AF control is done using focus signals obtained from only the face region. When no face is detected, AF control is performed using focus signals composited while increasing the weight for a focus signal closer to the center of the frame.

The first embodiment has exemplified AF control, but the present invention is not limited to this. For example, similar to AF control, the image capturing apparatus may switch between AE control using the face region as a main AE area and one using the fixed region as a main AE area on the premise that the luminance signals of the main AE area and sub AE area are composited. Alternatively, the image capturing apparatus may switch between luminance signal correction processing of correcting a luminance component to make the luminance value of the face region in the image signal close to a target value, and luminance signal correction processing of correcting a luminance component to make the average luminance value of the entire frame close to a target value. The image capturing apparatus may switch between WB control using a WB coefficient calculated to make the face region close to a skin color, and one using a WB coefficient simply obtained from the entire frame. The image capturing apparatus may switch between image correction processing of strongly applying noise reduction while suppressing the contrast when a face region is detected, and image correction processing of weakly applying noise reduction without suppressing the contrast when no face region is detected. Note that the image capturing signal processor 105 executes the WB control, luminance signal correction processing, and image correction processing.

The first embodiment has exemplified detection of a human face from an image. However, a person wearing a predetermined uniform, a pet registered in advance, or the like may be detected in the arrangement having an object detection function of detecting a specific object determined in advance from an image.

That is, the present invention is applicable when the first control executed when a specific object is detected from an image and the second control executed when no specific object is detected have different control contents.

Second Embodiment

In the first embodiment, the holding time until the first control transits to the second one and the transition speed when transiting the control are changed in accordance with pieces of information of a face immediately before the face becomes undetectable, and changes of them. In the second embodiment, the possibility that the face will reappear is determined from pieces of information of a face immediately before the face becomes undetectable, and changes of them. If the possibility of reappearance is high, the holding time is prolonged and the transition speed is decreased. If the possibility of reappearance is low, the holding time is shortened and the transition speed is increased.

Figure 4A:
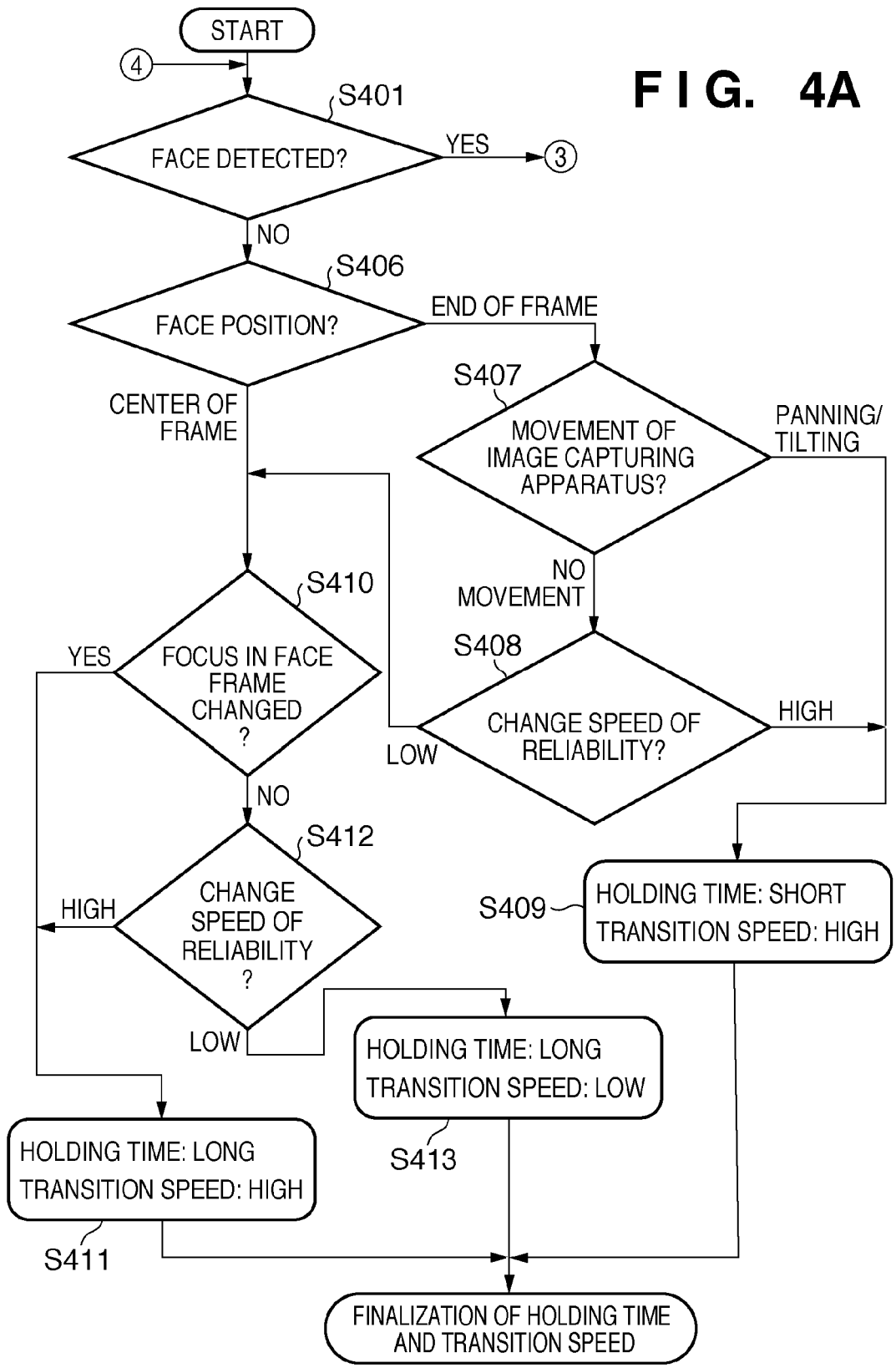
FIGS. 4A and 4B are flowcharts for explaining the setting operation of the holding time and transition speed when a face becomes undetectable in the second embodiment.
Figure 4B:
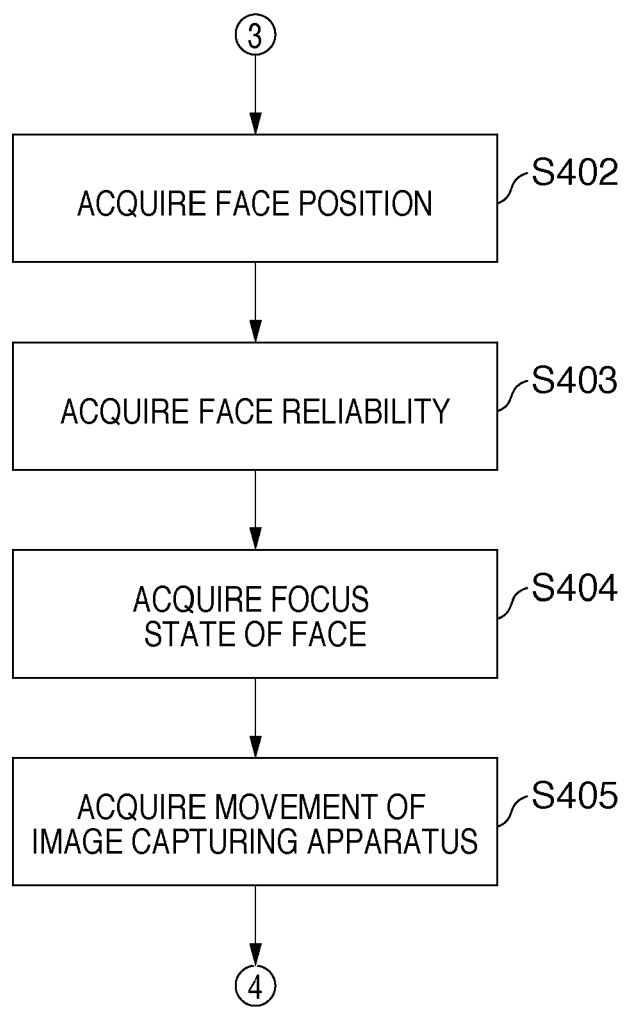

FIGS. 4A and 4B are flowcharts for explaining the setting operation of the holding time and transition speed when a face becomes undetectable in the second embodiment. This operation uses position information, reliability information, focus state information, and information on the movement of an image capturing apparatus. However, other kinds of information may be added. This sequence starts when a face detector 107 detects a face region from an image signal, and ends upon the lapse of the holding time after the face is lost.

In step S401 of FIG. 4A, a controller 110 acquires the latest face detection result from the face detector 107, and if the face detection is successful, advances to step S402. While the face region is detected, the controller 110 acquires, in steps S402 to S405, position information of the face region detected by the face detector 107, reliability information representing the reliability of the face, information on the focus state of the face, and information on the movement of the image capturing apparatus. The information on the focus state of the face is a focus signal extracted from the face region. The information on the movement of the image capturing apparatus includes information on the panning/tilting operation of the image capturing apparatus that is detected by a gyro or the like, and zoom information representing that a zooming operation was done.

If the face region becomes undetectable, the controller 110 advances from step S401 to step S406 to determine whether position information of a finally acquired face represents the vicinity of the center of the frame or the end of the frame. If the face position is close to the end of the frame, the controller 110 advances to step S407. In step S407, the controller 110 confirms the movement (whether panning, tilting, zooming, or the like was done) of the image capturing apparatus. If panning, tilting, zooming, or the like was executed by a predetermined amount or more and the direction of the operation is one in which the face falls outside the frame, the controller 110 determines that the possibility that the face will reappear is low, and thus sets a short holding time and high transition speed.

If the controller 110 determines in step S407 that the image capturing apparatus has not moved, it confirms the change speed of reliability information of the face in step S408. When the reliability information of the face has abruptly changed at the end of the frame, it is considered that a building element of the face has disappeared suddenly. It is therefore determined that the face moves outside the frame from the angle of view. For example, when half of the face falls outside the frame, only one eye serving as a building element of the face disappears, and the reliability value changes abruptly. From this, the controller 110 determines that the face has moved outside the frame and the possibility that the face will reappear is low. In step S409, the controller 110 sets a short holding time and high transition speed.

If the change of the reliability information is gradual in step S408 or the face position is near the center of the frame in step S406, the controller 110 advances to step S410. In step S410, the controller 110 determines whether a focus signal corresponding to a position where the face existed has changed greatly before and after the face becomes undetectable. If the focus signal has changed greatly, it is considered that any object obstructs the face and thus the face cannot be detected. The controller 110 then advances to step S411 to determine that the possibility that the face will reappear is high, and prolongs the holding time. If the face does not reappear even upon the lapse of the holding time, the controller 110 determines that the object has changed to another one, and increases the transition speed.

If the focus signal has not changed in step S410, the controller 110 confirms in step S412 whether the face reliability has changed. If the face reliability has changed abruptly, it is considered that any object obstructs the face, so the controller 110 advances to step S411 to perform the same processing as that described above.

If the change of the face reliability is gradual in step S412, the controller 110 considers that the face cannot be detected because the face which has looked straight turns away or back. In this case, the person still exists in the angle of view, so the controller 110 determines that the possibility that the face will reappear is high, and advances to step S413 to prolong the holding time. Since the person may still exist in the angle of view even upon the lapse of the holding time, the controller 110 decreases the transition speed during the control.

By determining the possibility of reappearance of a face in consideration of pieces of information, the image capturing apparatus may change the holding time till transition from the first control executed when a face is detected to the second one executed when no face is detected, and the transition speed when transiting the control.

When the face becomes undetectable, the holding time and transition speed are temporarily changed, but then a movement such as panning, tilting, or zooming occurs in the image capturing apparatus itself, it is considered that the shooting object has changed to another one. In this case, it may be determined that the possibility of reappearance of the face is low, and a short holding time and high transition speed may be set.

In the second embodiment, in a situation in which the face is considered to have moved outside the frame, if the movement of the image capturing apparatus itself after changing the holding time and transition speed is a movement in a direction in which the image capturing apparatus tracks the vanished face, it may be determined that the possibility of reappearance of the face is high, and a long holding time and low transition speed may be set.

When the face becomes undetectable, the face holding time and transition speed are temporarily changed, but then the face reappears before the lapse of the holding time or during transition of the control, the control transits to the first one executed when the face is detected again, and the holding time and transition speed are initialized. If the face becomes undetectable again, the possibility of reappearance of the face is determined again based on the information at this time, and the holding time and transition speed are changed.

When the image capturing apparatus is frequently switched between a state in which a face is detected and a state in which no face is detected, a predetermined number of results of determining how the face disappeared, based on information when the face becomes undetectable are accumulated. Every time the face disappears in the same way, it may be determined that the possibility of reappearance of the face is high next time the face becomes undetectable, and a long holding time and low transition speed may be set.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-001830, filed Jan. 7, 2009 and No. 2009-267830, filed Nov. 25, 2009, which are hereby incorporated by reference herein in their entirety.

What is claimed is:

1. An image capturing apparatus comprising:
an object detection unit which detects a specific object from an image signal; and a control unit which performs first control corresponding to the specific object when said object detection unit detects the specific object, and performs second control different from the first control when said object detection unit does not detect the specific object, wherein when the specific object becomes undetectable after the specific object has been detected and the first control has been performed, said control unit switches the first control to the second control after a predetermined holding time elapsed from a timing when the specific object becomes undetectable, wherein said control unit changes the predetermined holding time based on information before the specific object becomes undetectable, and wherein the information includes at least one of a position of the specific object in the image signal, a change of the position of the specific object in the image signal, a size of the specific object in the image signal, a change of the size of the specific object in the image signal, a distance to the specific object, a change of the distance to the specific object, a focus state of the specific object, a change of the focus state of the specific object, presence/absence of an operation including one of zooming, panning, and tilting of the image capturing apparatus, a direction of the operation including one of zooming, panning, and tilting of the image capturing apparatus, a reliability serving as a parameter representing a level of matching between an object and a condition used to detect the specific object, and a change of the reliability serving as the parameter representing the level of matching between the object and the condition used to detect the specific object.

2. The apparatus according to claim 1, wherein the specific object includes a human face.

3. The apparatus according to claim 1, wherein said control unit performs the first control in which a focus position of a lens is controlled by using a focus signal in an area in which the specific object is present and the second control in which the focus position of the lens is controlled by using a focus signal in an area which does not relate to the specific object.

4. An image capturing apparatus comprising:
an object detection unit which detects a specific object from an image signal; and
a control unit which performs first control corresponding to the specific object when said object detection unit detects the specific object, and performs second control different from the first control when said object detection unit does not detect the specific object,
wherein when the specific object becomes undetectable after the specific object has been detected and the first control has been performed, said control unit switches the first control to the second control after a predetermined holding time elapsed from a timing when the specific object becomes undetectable, and
wherein when one of zooming, panning, and tilting operations of the image capturing apparatus occurs after the specific object has become undetectable, said control unit shortens the predetermined holding time.

5. An image capturing apparatus comprising:
an object detection unit which detects a specific object from an image signal; and
a control unit which performs first control corresponding to the specific object when said object detection unit detects the specific object, and performs second control different from the first control when said object detection unit does not detect the specific object,
wherein when the specific object becomes undetectable after the specific object has been detected and the first control has been performed, said control unit switches the first control to the second control after a predetermined holding time elapsed from a timing when the specific object becomes undetectable, and
wherein when a position of the specific object before the specific object becomes undetectable is close to an end of an angle of view in the image signal, and either of panning and tilting operations of the image capturing apparatus occurs in a direction in which the specific object existed after the specific object has become undetectable, said control unit elongates the predetermined holding time.

6. A method of controlling an image capturing apparatus, comprising the steps of:
detecting a specific object from an image signal captured by the image capturing apparatus;
performing first control corresponding to the specific object when the specific object is detected in the step of detecting a specific object, and performing second control different from the first control when the specific object is not detected in the step of detecting a specific object; and
when the specific object becomes undetectable after the specific object has been detected and the first control has been performed, switching the first control to the second control after a predetermined holding time elapsed from a timing when the specific object becomes undetectable,
wherein, in the step of switching the first control to the second control, the predetermined holding time is changed based on information before the specific object becomes undetectable, and
wherein the information includes at least one of a position of the specific object in the image signal, a change of the position of the specific object in the image signal, a size of the specific object in the image signal, a change of the size of the specific object in the image signal, a distance to the specific object, a change of the distance to the specific object, a focus state of the specific object, a change of the focus state of the specific object, presence/absence of an operation including one of zooming, panning, and tilting of the image capturing apparatus, a direction of the operation including one of zooming, panning, and tilting of the image capturing apparatus, a reliability serving as a parameter representing a level of matching between an object and a condition used to detect the specific object, and a change of the reliability serving as the parameter representing the level of matching between the object and the condition used to detect the specific object.

7. A non-transitory computer readable storage medium storing a program causing a computer to execute a control method defined in claim 6.

8. An image capturing apparatus comprising:
an object detection unit which detects a specific object from an image signal; and
a control unit which performs first control corresponding to the specific object when said object detection unit detects the specific object, and performs second control different from the first control when said object detection unit does not detect the specific object,
wherein when the specific object becomes undetectable after the specific object has been detected and the first control has been performed, said control unit switches the first control to the second control after a predetermined holding time elapsed from a timing when the specific object becomes undetectable, and wherein when a position of the specific object before the specific object becomes undetectable is close to an end of an angle of view in the image signal, said control unit shortens the predetermined holding time compared with when the position is close to a center of the angle of view in the image signal.

9. An image capturing apparatus comprising:

an object detection unit which detects a specific object from an image signal; and a control unit which performs first control corresponding to the specific object when said object detection unit detects the specific object, and performs second control different from the first control when said object detection unit does not detect the specific object, wherein when the specific object becomes undetectable after the specific object has been detected and the first control has been performed, said control unit switches the first control to the second control after a predetermined holding time elapsed from a timing when the specific object becomes undetectable, and wherein when a size of the specific object before the specific object becomes undetectable is not more than a threshold size, said control unit shortens the predetermined holding time compared with when the size is larger than the threshold size.

10. An image capturing apparatus comprising:

an object detection unit which detects a specific object from an image signal; and a control unit which performs first control corresponding to the specific object when said object detection unit detects the specific object, and performs second control different from the first control when said object detection unit does not detect the specific object, wherein when the specific object becomes undetectable after the specific object has been detected and the first control has been performed, said control unit switches the first control to the second control after a predetermined holding time elapsed from a timing when the specific object becomes undetectable, and wherein when a distance between the image capturing apparatus and the specific object is not more than a threshold distance, said control unit shortens the predetermined holding time compared with when the distance is larger than the threshold distance.

11. An image capturing apparatus comprising:

an object detection unit which detects a specific object from an image signal; and a control unit which performs first control corresponding to the specific object when said object detection unit detects the specific object, and performs second control different from the first control when said object detection unit does not detect the specific object, wherein when the specific object becomes undetectable after the specific object has been detected and the first control has been performed, said control unit gradually switches the first control to the second control, wherein said control unit changes a time period from a start of changing the first control to the second control to an end of changing the first control to the second control based on information before the specific object becomes undetectable, and wherein the information includes at least one of a position of the specific object in the image signal, a change of the position of the specific object in the image signal, a size of the specific object in the image signal, a change of the size of the specific object in the image signal, a distance to the specific object, a change of the distance to the specific object, a focus state of the specific object, a change of the focus state of the specific object, presence/absence of an operation including one of zooming, panning, and tilting of the image capturing apparatus, a direction of the operation including one of zooming, panning, and tilting of the image capturing apparatus, a reliability serving as a parameter representing a level of matching between an object and a condition used to detect the specific object, and a change of the reliability serving as the parameter representing the level of matching between the object and the condition used to detect the specific object.

12. An image capturing apparatus comprising:

an object detection unit which detects a specific object from an image signal; and a control unit which performs first control corresponding to the specific object when said object detection unit detects the specific object, and performs second control different from the first control when said object detection unit does not detect the specific object, wherein when the specific object becomes undetectable after the specific object has been detected and the first control has been performed, said control unit gradually switches the first control to the second control, wherein said control unit changes a time period from a start of changing the first control to the second control to an end of changing the first control to the second control, and wherein when one of zooming, panning, and tilting operations of the image capturing apparatus occurs after the specific object has become undetectable, said control unit shortens the time period.

13. An image capturing apparatus comprising:

an object detection unit which detects a specific object from an image signal; and a control unit which performs first control corresponding to the specific object when said object detection unit detects the specific object, and performs second control different from the first control when said object detection unit does not detect the specific object, wherein when the specific object becomes undetectable after the specific object has been detected and the first control has been performed, said control unit gradually switches the first control to the second control, wherein said control unit changes a time period from a start of changing the first control to the second control to an end of changing the first control to the second control, and wherein when a position of the specific object before the specific object becomes undetectable is close to an end of an angle of view in the image signal, and either of panning and tilting operations of the image capturing apparatus occurs in a direction in which the specific object existed after the specific object has become undetectable, said control unit elongates the time period.

14. An image capturing apparatus comprising:

an object detection unit which detects a specific object from an image signal; and a control unit which performs first control corresponding to the specific object when said object detection unit detects the specific object, and performs second control different from the first control when said object detection unit does not detect the specific object, wherein when the specific object becomes undetectable after the specific object has been detected and the first control has been performed, said control unit gradually switches the first control to the second control, wherein said control unit changes a time period from a start of changing the first control to the second control to an end of changing the first control to the second control, and wherein when a position of the specific object before the specific object becomes undetectable is close to an end of an angle of view in the image signal, said control unit shortens the time period compared with when the position is close to a center of the angle of view in the image signal.

15. An image capturing apparatus comprising:

an object detection unit which detects a specific object from an image signal; and a control unit which performs first control corresponding to the specific object when said object detection unit detects the specific object, and performs second control different from the first control when said object detection unit does not detect the specific object, wherein when the specific object becomes undetectable after the specific object has been detected and the first control has been performed, said control unit gradually switches the first control to the second control, wherein said control unit changes a time period from a start of changing the first control to the second control to an end of changing the first control to the second control, and wherein when a size of the specific object before the specific object becomes undetectable is not more than a threshold size, said control unit shortens the time period compared with when the size is larger than the threshold size.

16. An image capturing apparatus comprising:

an object detection unit which detects a specific object from an image signal; and a control unit which performs first control corresponding to the specific object when said object detection unit detects the specific object, and performs second control different from the first control when said object detection unit does not detect the specific object, wherein when the specific object becomes undetectable after the specific object has been detected and the first control has been performed, said control unit gradually switches the first control to the second control, wherein said control unit changes a time period from a start of changing the first control to the second control to an end of changing the first control to the second control, and wherein when a distance between the image capturing apparatus and the specific object is not more than a threshold distance, said control unit shortens the time period compared with when the distance is larger than the threshold distance.

17. The apparatus according to claim 11, wherein said control unit performs the first control in which a focus position of a lens is controlled by using a focus signal in an area in which the specific object is present and the second control in which the focus position of the lens is controlled by using a focus signal in an area which does not relate to the specific object.

18. A method of controlling an image capturing apparatus, comprising the steps of:

detecting a specific object from an image signal captured by the image capturing apparatus;

performing first control corresponding to the specific object when the specific object is detected in the step of detecting a specific object, and performing second control different from the first control when the specific object is not detected in the step of detecting a specific object; and when the specific object becomes undetectable after the specific object has been detected and the first control has been performed, gradually switching the first control to the second control, wherein, in the step of switching the first control to the second control, a time period from a start of changing the first control to the second control to an end of changing the first control to the second control is changed based on information before the specific object becomes undetectable, and wherein the information includes at least one of a position of the specific object in the image signal, a change of the position of the specific object in the image signal, a size of the specific object in the image signal, a change of the size of the specific object in the image signal, a distance to the specific object, a change of the distance to the specific object, a focus state of the specific object, a change of the focus state of the specific object, presence/absence of an operation including one of zooming, panning, and tilting of the image capturing apparatus, a direction of the operation including one of zooming, panning, and tilting of the image capturing apparatus, a reliability serving as a parameter representing a level of matching between an object and a condition used to detect the specific object, and a change of the reliability serving as the parameter representing the level of matching between the object and the condition used to detect the specific object.

19. A non-transitory computer readable storage medium storing a program causing a computer to execute a control method defined in claim 18.

* * * * *